US00RE43942E

(19) United States
(12) Reissued Patent
Mezzalira et al.

(10) Patent Number: US RE43,942 E
(45) Date of Reissued Patent: Jan. 29, 2013

(54) REINFORCED FLEXIBLE HOSE

(75) Inventors: Rinaldo Mezzalira, Arcignano di Sandrigo (IT); Alessandro Mezzalira, legal representative, Arcignano di Sandrigo (IT); Valentino Vigolo, Caldogno (IT)

(73) Assignee: FITT S.p.A., Sandrigo (Vincenza) (IT)

(21) Appl. No.: 13/295,084

(22) Filed: Nov. 13, 2011

Related U.S. Patent Documents

Reissue of:
(64) Patent No.: 6,199,594
Issued: Mar. 13, 2001
Appl. No.: 09/367,519
PCT Filed: Apr. 25, 1997
PCT No.: PCT/EP97/02155
§ 371 (c)(1),
(2), (4) Date: Aug. 14, 1999
PCT Pub. No.: WO97/41719
PCT Pub. Date: Nov. 13, 1997

(30) Foreign Application Priority Data

Feb. 20, 1997 (IT) ..... VI97A0031

(51) Int. Cl.
*F16L 11/08* (2006.01)
(52) U.S. Cl. ..... 138/130; 138/125; 138/126
(58) Field of Classification Search ..... 138/123–126, 138/177, 172, 130
See application file for complete search history.

(56) References Cited

U.S. PATENT DOCUMENTS 3,253,618 A * 5/1966 Cook ..... 138/125
3,682,202 A * 8/1972 Buhrmann et al. ..... 138/126
3,921,674 A * 11/1975 Logan et al. ..... 138/130
4,044,799 A * 8/1977 Higbee et al. ..... 138/125
4,091,063 A * 5/1978 Logan ..... 264/506
4,308,896 A * 1/1982 Davis ..... 138/126
4,553,568 A * 11/1985 Piccoli et al. ..... 138/125
4,679,599 A * 7/1987 Newberry et al. ..... 138/104
4,989,643 A * 2/1991 Walton et al. ..... 138/126
5,264,262 A * 11/1993 Igarashi ..... 428/36.9
5,477,888 A * 12/1995 Mezzalira ..... 138/125

FOREIGN PATENT DOCUMENTS

DE 3408251 * 7/1984
DE 3408241 A * 1/1985

OTHER PUBLICATIONS

European Patent Application 0623776 Rinaldo Mezzalira, Sep. 1994.*
European Patent Application 0726416 Douglas Bruce Wood, Aug. 1996.*

* cited by examiner

*Primary Examiner* — Patrick F Brinson
(74) *Attorney, Agent, or Firm* — Themis Law

(57) ABSTRACT

A reinforced flexible hose includes at least one inner tubular layer (2) of plastic or rubber, a knitted reinforcement (3), which has substantially, parallel rows (4) and lines (5) of substantially parallel stitches, with respective stitch counts per unit length of the hose (Nm, Nr); and an outer layer (6) which is superimposed on the reinforcement layer (3) to protect it. The knitted reinforcement layer (3) is provided in the form of a single tubular layer and is wrapped around the outer surface of the inner tubular layer (2); the rows (4) and lines (5) of stitches are substantially helical, with respective longitudinal pitches ($P_m$, $P_r$) and inclinations which are mutually opposite with respect to the longitudinal axis (Y). The longitudinal pitch 2 ($P_r$) of the lines (5) of stitches is substantially proportional to the square of the outside diameter ($\phi_o$) of the inner layer (2), whilst the number of lines ($N_r$) of stitches per unit length of the hose is directly proportional to the outside diameter ($\phi_o$) of the inner layer (2).

8 Claims, 1 Drawing Sheet

REINFORCED FLEXIBLE HOSE

Matter enclosed in heavy brackets [ ] appears in the original patent but forms no part of this reissue specification; matter printed in italics indicates the additions made by reissue.

The present invention relates to a flexible hose made of plastic or reinforced rubber, with a tubular braiding made of fabric which can be used in the field of irrigation or in the field of the delivery of pressurized fluids in open or closed circuits.

Conventional flexible hoses of the above described type are generally formed by a first tubular inner layer, made of plastic or rubber, on which a tubular fabric is applied for increasing the pressure resistance of the flexible hose, reducing its deformation and increasing its performance.

One of the most widespread and most suitable conventional hose is the so-called "mesh-reinforced" type, in which the tubular reinforcement fabric is constituted by a series of threads spirally wound on the flexible hose in parallel and equidistant rows and superimposed on an equal number of transverse threads along likewise parallel and equidistant lines which are arranged symmetrically with respect to the axis of the hose so as to form a mesh with diamond-shaped cells.

The fabric surrounding the outer surface of the inner layer of plastic is then covered by a further outer layer of plastic or rubber which is generally but not necessarily transparent and fixes the meshed fabric to the flexible hose and protects it. With this type of braiding, the flexible hose is suitable to withstand a higher pressure than the hose without braiding and to reduce its deformation, because the weaving is of the non-stretch type and therefore prevents the inner layer from deforming.

A drawback of the above described mesh-reinforced hose is the fact that its flexibility is relatively limited; that is to say, the bending radiuses to which the hose can be subjected are rather wide with respect to knit hoses.

Another conventional type of flexible hose is the one in which the braiding that surrounds the outer part of the hose is formed by knitting instead of weaving.

EP-A-0 527 512, in the name of this same Applicant, discloses a hose provided with a particular knit reinforcement in which the individual stitches are shaped like trapezoidal loops with filaments which interweave in the corners. This type of knit reinforcement has the virtue of making the hose stronger than similar knit flexible hoses.

It is known that knitting is a special weaving which is obtained by means of one or more threads which are mutually linked with more or less complex turns, also known as loops or basic stitches, which give the knit fabric great elasticity.

So-called chain knitting is constituted by a series of mutually parallel threads which are fed by multiple spools and are curved so as to form an equal number of lines of stitches which are interlocked both in the weft direction and in the chain direction; their interweaving produces a transverse series of rows of stitches and a longitudinal series of lines of stitches or cords.

One of the commercially most frequent flexible hoses is the one in which the knitting is of the tricot chain type, where this term describes a stitch in which each thread forms the stitch by interweaving with one or more threads to its right and with one or more threads to its left.

Although, on one hand, the flexible hose with tricot knitting is more flexible, since notoriously the knitting yields as the diameter of the hose increases because of the pressure increase, on the other hand the shortcoming of knitted fabric, and especially of tricot-knitted fabric, is that as the pressure increases, the hose is subjected to a torsional effect by the fluid which flows under pressure inside it. This is due to the helical orientation of the rows of stitches which, by contrast with the substantially longitudinal orientation of the lines, cause an unbalanced reaction, and particularly torque, in the hose.

EP-A-0 623 776 in the name of this same Applicant discloses a hose which includes, from the inside outward: an inner layer of plastic or rubber which has an outer surface; a chain-knit part, which has rows and lines of stitches, and has a tubular shape and is wound in a single layer around the outer surface of the inner layer; and an outer stitch protection layer; wherein the lines and rows of stitches are inclined in opposite directions with substantially the same inclination with respect to the longitudinal axis of the hose in order to eliminate the effects of the torque produced by the pressure loads inside the hose.

This prior patent provides no correlation among the various parameters of the knit reinforcement part, such as the pitch, the inclination and the thread count per unit length, neither among them or with respect to the dimensional parameters of the inner layer. Accordingly, due to the large number of parameters involved and to their large number of possible combinations, the person skilled in the art does not have all the information required to assuredly achieve the intended results or at least optimize the anti-torque effect of the hose.

An aim of the present invention is to eliminate the above described drawbacks.

A further aim of the invention is to provide a correlation between the various parameters of the braiding and those of the inner layer, such as to eliminate the torque produced on the knitted fabric by the pressure of the fluid, without thereby renouncing flexibility and bursting pressure resistance characteristics.

This aim and other objects which will become apparent hereinafter are achieved by a flexible hose according to the invention, which in accordance with the content of the first claim includes: at least one inner tubular layer of plastic or rubber which has an outside diameter and a longitudinal axis; a knitted reinforcement of the chain type, which has rows of substantially parallel stitches and lines of substantially parallel stitches with respective stitch counts per unit length in a longitudinal direction, the knitted reinforcement layer being provided in the form of a single tubular layer and being wrapped-around the outer surface of the inner tubular layer coaxially thereto, the rows and lines of stitches being substantially helical with respective longitudinal pitches and inclinations which are mutually opposite with respect to the longitudinal axis, so as to eliminate the torque applied by the pressure of the fluid inside it; and an outer layer which is superimposed on the reinforcement layer to protect it; characterized in that the longitudinal pitch of the lines of stitches is substantially proportional to the square of the outside diameter of the inner layer.

Surprisingly, it has been found that in order to eliminate the torque induced by the internal pressure of the fluid, the pitch of the lines of stitches must increase as the inner diameter but not according to a linear relation but rather according to a quadratic relation, in order to effectively contrast the rotation induced by the uncoiling of the helical threads of the stitches.

At the same time, the longitudinal pitch of the rows of stitches can be kept substantially constant and independent of the outside diameter of the inner layer.

Preferably, the number of lines of stitches per unit length of the hose is directly proportional to the outside diameter of the inner layer.

Further characteristics and advantages of the present invention will become apparent from the following description of a preferred embodiment of the invention, illustrated only by way of non-limitative example in the accompanying drawings, wherein.

Figure 1:
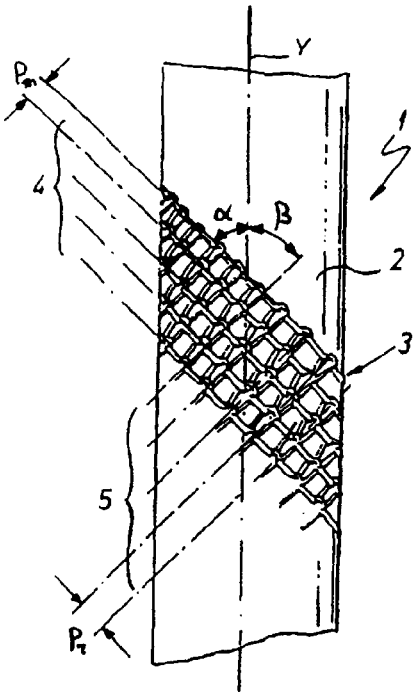
FIG. 1 is a view of a portion of the flexible hose according to the invention.

With reference to the above figures, the flexible hose according to the invention, generally designated by the reference numeral 1, is formed by an inner layer 2 made of polymeric or elastomeric material such as PVC, natural or synthetic rubber, which is essentially tubular and has a longitudinal axis Y which coincides with the axis of the flexible hose, an inner surface which has an inside diameter $\phi_i$, and an outer surface which has a diameter $\phi_o$.

Figure 2:
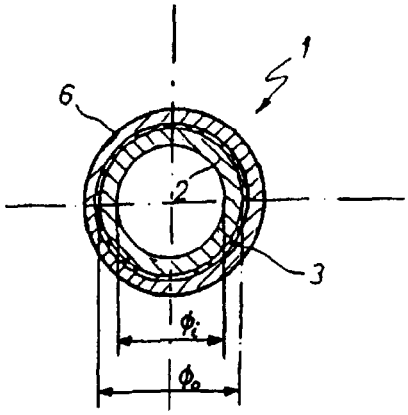
FIG. 2 is a sectional view of the hose of FIG. 1.

A chain-knitted part, generally designated by the reference numeral 3, is knitted on the inner layer 2 and is formed by substantially helical rows 4 of stitches, which are mutually parallel and have an inclination angle $\alpha$ with respect to the axis Y of the hose 10 of FIG. 2, and by lines 5 which are also substantially helical and have an inclination angle B with respect to the axis Y, but in the opposite direction with respect to the rows 4.

The rows and lines have respective longitudinal pitches $P_m$ and $P_r$. Furthermore, the linear count or number of lines per unit length (100 mm) of the rows or stitches is respectively $N_m$ and $N_r$.

It is known that if the outside diameter $\phi_o$ of the inner layer 2 on which the braiding 3 is wound increases, it is necessary to increase the pitch of the lines in order to be able to contain the torque. However, until now a precise correlation between these parameters had not been established. Surprisingly, tests and experiments have allowed to verify that the relation between these parameters is not linear but is instead quadratic.

In other words, this relation can be expressed by the general formula:

$$P_r = K\phi^2 \quad (1)$$

where the parameter K depends on the materials and units of measure used.

In the case of PVC and if all parameters are expressed in mm, the constant K of formula (1) is generally between 0.35 and 0.50 $mm^{-1}$ and is preferably equal to approximately 0.45 $mm^{-1}$.

It is noted that the knitted reinforcement of the hose of FIG. 1 is formed by chain stitches of the tricot type. These stitches are formed directly on the hose by so-called knitting machines which are commercially available and whose stitch-forming method is well-known.

With this crossed and inclined arrangement with respect to the axis Y of the hose, the torque which occurs on the hose in case of normal chain stitches, for example with substantially longitudinal lines, is canceled out. On the contrary, by arranging the lines transversely instead of longitudinally the rotary force component which appeared due to the coiling of the spiral-shaped rows 5 is compensated.

With this type of knitting, the forces produced by the lines and rows of stitches mutually compensate until they cancel each other out, thus making the hose 1 substantially insensitive to the torque induced by the pressure of the fluid inside the hose.

It is noted instead that the longitudinal pitch $P_m$ of the rows of stitches can be kept substantially constant and independent of the outside diameter $\phi_o$ of the inner layer.

Furthermore, the number $N_r$ of lines of stitches per unit length of the hose is substantially directly proportional to the outside diameter $\phi_o$.

The angles $\alpha$ and $\beta$ are generally mutually different, but their sum is approximately constant and equal to, or slightly smaller than, 90° as the value of the outside diameter $\phi_o$ of the inner layer 2 varies.

In particular, it has been observed that the inclination angle $\beta$ of the lines of stitches 5 is substantially proportional to the square root of the outside diameter $\phi_o$ of the inner layer 2.

When using values between 12 and 37 mm for the outside diameter $\phi_o$ and between 10 and 32 mm for the inside diameter $\phi_i$, it has been observed that the number of rows per unit length $N_m$ is substantially constant and is between 30 and 40 rows per 100 mm, with an average value of 35 rows per 100 mm.

In the same conditions, the number of lines per unit length $N_r$ is substantially proportional to the outside diameter $\phi_o$ of the inner layer 2 and is between 10 and 16 rows per 100 mm.

Figure 3:
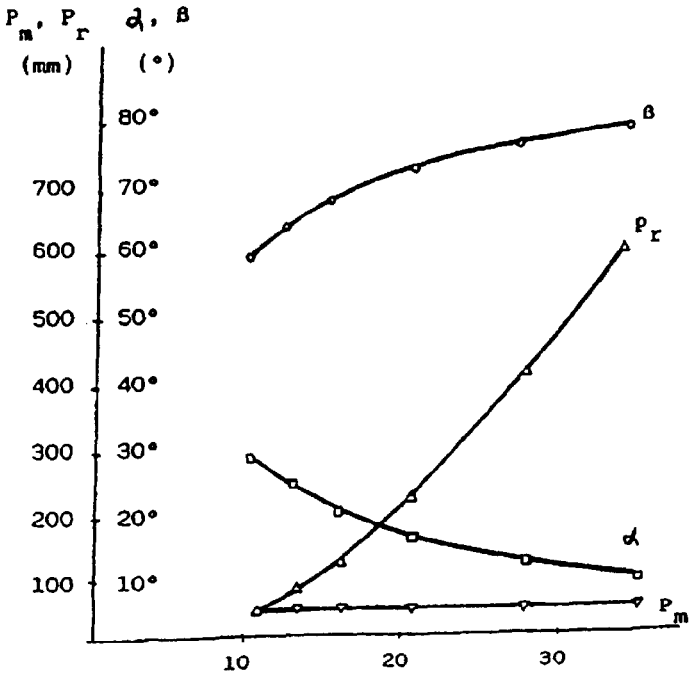
FIG. 3 is a diagram showing the main parameters of the chain knitting of the reinforcement braiding according to the invention with respect to the outside diameter of the inner layer.

Some of the above parameters have been plotted in the chart of FIG. 3.

Finally, an outer layer 6 made of plastic or rubber locks the chain knitting thus formed on the surface of the hose, as occurs besides in all known flexible hose structures.

It is important to note that the inclination of the lines and rows of stitches can be slightly modified with respect to the above indicated values according to the material of the hose, its diameter, the type of knitting, the number of spools, the pitch of the rows and lines, and the type and/or count of the thread.

What is claimed is:

1. Reinforced flexible hose, comprising:

at least one inner tubular layer (2) of plastic or rubber which has an outside ($\phi_e$) diameter and a longitudinal axis (Y);

a chain knitted-type reinforcement layer (3), which has rows (4) of substantially parallel stitches and lines (5) of substantially parallel stitches, with respective stitch counts per unit length ($N_m$, $N_r$) in a longitudinal direction;

said knitted reinforcement layer (3) being provided in the form of a single tubular layer and being formed on the outer surface of said inner tubular layer (2) coaxially thereto;

said rows (4) of stitches and said lines (5) of stitches being substantially helical with respective longitudinal pitches ($P_m$, $P_r$) and inclinations ($\alpha$, $\beta$) which are mutually opposite with respect to the longitudinal axis (Y), so as to eliminate the torque applied by-the pressure of the fluid inside it; and an outer layer (6) which is superimposed on said reinforcement layer (3) to protect it;

characterized in that the longitudinal pitch ($P_r$) of said lines (5) of stitches is substantially proportional to the square of the outside diameter ($\phi_o$) of said inner layer (2).

2. Flexible hose according to claim 1, characterized in that the number of lines of stitches per unit length ($N_r$) is substantially directly proportional to the outside diameter ($\phi_o$) of said inner layer (2).

3. Flexible hose according to claim 1, characterized in that the longitudinal pitch ($P_m$) of the rows of stitches is substantially constant and independent of the outside diameter ($\phi_o$) of said inner layer (2).

4. Flexible hose according to claim 1, characterized in that said rows (4) and said lines (5) of substantially helical stitches have different inclination angles ($\alpha$, $\beta$) whose sum is substantially constant and equal to, or slightly lower than, 90° as the value of the outside diameter ($\phi_o$) of said inner layer (2) varies.

5. Flexible hose according to claim 4, characterized in that the angle of inclination ($\beta$) of the lines (5) of stitches is substantially proportional to the square root of the outside diameter ($\phi_o$) of said inner layer (2).

6. Flexible hose according to claim 1, characterized in that in said inner layer (2) the outside diameter ($\phi_o$) is between 12 and 27 mm and the inside diameter ($\phi_i$) is between 10 and 32 mm.

7. Flexible hose according to claim 1, characterized in that the number of rows per unit length ($N_m$) is substantially constant as the outside diameter ($\phi_o$) of said inner layer (2) varies, and is between 30 and 40 rows per 100 mm, with an average number of 35 rows per 100 mm.

8. Flexible hose according to claim 1, characterized in that the number of lines per unit length ($N_r$) is substantially proportional to the outside diameter ($\phi_o$) of said inner layer (2) and is between 10 and 16 lines per 100 mm.

* * * * *